United States Patent [19]

Tam et al.

[11] Patent Number: 5,754,186
[45] Date of Patent: May 19, 1998

[54] METHOD AND APPARATUS FOR BLENDING IMAGES

[75] Inventors: Tommy H. Tam, Mountain View; Michael L. Gough, Ben Lomond, both of Calif.

[73] Assignee: Apple Computer, Inc., Cupertino, Calif.

[21] Appl. No.: 597,533

[22] Filed: Feb. 2, 1996

Related U.S. Application Data

[63] Continuation of Ser. No. 193,798, Feb. 9, 1994, abandoned, which is a continuation-in-part of Ser. No. 60,572, May 10, 1993, Pat. No. 5,638,501.

[51] Int. Cl.$^6$ .................................................. G06F 15/00
[52] U.S. Cl. ........................................................ 345/435
[58] Field of Search ................................. 395/133, 135; 345/433, 435, 156, 157, 158

[56] References Cited

U.S. PATENT DOCUMENTS

| | | | |
|---|---|---|---|
| 4,823,281 | 4/1989 | Evangelisti et al. | 364/518 |
| 4,868,765 | 9/1989 | Diefendorff | 364/521 |
| 5,179,639 | 1/1993 | Taagge | 395/128 |
| 5,185,808 | 2/1993 | Cok | 382/1 |
| 5,265,214 | 11/1993 | Nitta | 395/122 |
| 5,283,867 | 2/1994 | Bayby et al. | 395/164 |
| 5,297,243 | 3/1994 | Shiotani et al. | 395/135 |
| 5,313,227 | 5/1994 | Aoki et al. | 345/118 |
| 5,313,571 | 5/1994 | Hirose et al. | 395/140 |
| 5,329,613 | 7/1994 | Biase et al. | 395/122 |
| 5,335,318 | 8/1994 | Kirk | 395/131 |
| 5,463,728 | 10/1995 | Blahut et al. | 395/158 |
| 5,467,443 | 11/1995 | Johnson et al. | 395/141 |
| 5,469,541 | 11/1995 | Kingman et al. | 395/158 |
| 5,475,812 | 12/1995 | Corona et al. | 395/158 |
| 5,651,107 | 7/1997 | Frank et al. | 395/344 |

OTHER PUBLICATIONS

Anonymous, Method to Allow Users to Select Transparent Color for Windows, Mar. 1993, Research Disclosure.

*Primary Examiner*—Phu K. Nguyen
*Attorney, Agent, or Firm*—Beyer & Weaver, LLP

[57] ABSTRACT

A method and apparatus for blending first and second images stored in respective first and second VRAM buffers for production of a combined image on a computer display screen. The method includes storing a first image to be blended in a first VRAM buffer and storing a second image to be blended in a second VRAM buffer. The blending mechanism includes the process of loading the respective VRAM buffers with component 4 bit contributions of information representing first and second gray levels or color tones pixelwise representative of corresponding pixel portions of the respective first and second images to be combined. The output of the VRAM buffers combines these contributions of the respective first and second images to produce an address to a look-up table which produces at that particular address location a blended gray level or color tone representative of a blending of the two gray levels or color tones. This combines the first video data and the second video data to produce a blended image on the computer display screen.

32 Claims, 10 Drawing Sheets

METHOD AND APPARATUS FOR BLENDING IMAGES

CROSS-REFERENCE TO RELATED APPLICATIONS

This application is a continuation of application Ser. No. 08/193,798, filed on Feb. 9, 1994, now abandoned, which is a continuation-in-part of patent application Ser. No. 08/060,572, filed May 10, 1993, now U.S. Pat. No. 5,638,501, entitled "Method and Apparatus for Displaying an Overlay Image;" and Ser. No. 08/130,079, filed Sep. 30, 1993, entitled "Method & Apparatus for Providing Translucent Images on a Computer Display," both of them on behalf of Gough et al. These applications are assigned to the same assignee as herein, and are incorporated herein by reference in their entirety.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware computer system, hereinafter generically referred to as a "pen computer system," "pen computer," or the like. A pen-based computer system is typically a small, hand-held computer where the primary method for inputting data includes a "pen" or stylus. A pen-aware computer system is one which has been modified to accept pen inputs in addition to traditional input methods.

A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

Typically, graphical images can be input into the pen computer systems by merely moving the stylus across the surface of the screen, i.e. making a "stroke" on the screen. A stroke is defined as the engagement of the screen with a stylus, the movement of the stylus across the screen (if any), and its subsequent disengagement from the screen. As the CPU senses the position and movement of the stylus, it can generate a corresponding image on the screen to create the illusion that the stylus is drawing the image directly upon the screen, i.e., that the stylus is "inking" an image on the screen. With suitable recognition software, text and numeric information can also be entered into the pen-based computer system in a similar fashion. Methods for recognizing the meaning of "ink" are well known to those skilled in the art.

Pen computer systems tend to discourage the use of a keyboard as an input device. Most of the software written for pen computers is designed to function well with pen strokes and by "tapping" the stylus against the computer screen in defined areas. A "tap" is a stroke which does not move substantially on the screen. In addition, a primary feature of many pen computer systems is their portability, which a keyboard, if included with the pen system, would seriously degrade.

In some instances, however, the need arises on a pen-based computer for data entry in a keyboard-like fashion. For example, the pen-based computer might be running a non-pen aware program that normally accepts characters from a keyboard. Also, in some cases, the only way to enter data efficiently might be to use a keyboard-like input device.

In particular, a need might arise on a pen computer to enter a command or character that is normally or most efficiently executed with keystrokes on a keyboard-based system. In some pen computer systems, such keyboard-like entry of commands can be accomplished using a keyboard image displayed on the screen of the pen computer. The keyboard image resembles a standard keyboard, and keys are selected using a stylus. Most keyboard commands and characters can be entered in this fashion. Another alternative is to provide a recognition window for inputting handwritten data which is then recognized and sent to an application program as if it were typed from a keyboard. A problem with all such input approaches is that they occupy valuable screen space, which is often very limited on pen computer systems.

The efficient use of the available display screen space for observation of images and windows containing images, while particularly pronounced for pen computer systems, is common to all computer systems which display information or images to the user. No matter how large a particular display may be, a particular user will be tempted to attempt to display more information on the screen than can effectively be handled.

Images or information presented on a display screen are typically presented as opaque images, i.e., images "behind" a displayed image are obscured. This is the case with display windows which are layered on a particular screen, with the uppermost window image partially or completely blocking the view of the lower window. For two windows to be capable of interaction, it is preferable that the user be able to observe both images at the same time, or at close to the same time. The co-pending patent applications disclose apparatus and methods for transparently overlaying images such that a user can simultaneously view two overlaid windows or layers of information. The present application expands on a hardware implementation of the transparent overlaying invention. The hardware implementation has the advantage of saving CPU processing time when in blending operation during use.

SUMMARY OF THE INVENTION

According to the invention, first and second images are stored at separate VRAM hardware buffer locations for output on a VRAM output bus. One of the images may be generated by a selected application program, and the other image may be currently user generated, for example by direct user scripting or handwriting with a stylus on an interactive GUI. The images stored in VRAM are subject to being updated in real time, while the current images stored in VRAM are already being blended in single or multiple pixel groups for display on a computer screen. Blending is accomplished under direction of a video driver chip, which controls application of the VRAM contents along the VRAM output bus which connects the VRAM hardware with the video driver. According to a preferred embodiment of the invention, the video driver chip contains a look-up table with an address input which is connected to the VRAM output bus. One version of the invention calls for the VRAM output bus to be 16 bits wide, broken into two 8-bit buses, each capable of addressing 256 memory locations in the look-up table. The look-up table, according to one version, is three column wide in order to hold intensity level data for three colors, preferably red, green, and blue. According to one version of the invention, a single one of these columns of the look-up table is employed to represent a plurality of gray scale levels. Eight of the 16 bits of the VRAM output bus are employed to address the look-up table for a first selected pixel to be displayed; the remaining eight of the 16 bits in the VRAM bus are employed as an address for a second pixel to be displayed. The display driver chip accordingly calls for delivery of two addresses in parallel from the VRAM hardware buffer, which the display driver applies in succession to establish color or gray scale intensity levels of successive pixels displayed on the output display. Blending of the images stored separately in VRAM is accomplished by the combination of four pixel, i.e., nibble sized, groupings of bits from the VRAM buffer which are derived from separate VRAM buffer locations allocated to the respective first and second images to be blended. Accordingly, as to a single pixel, two sets of four bits of information in the separate VRAM locations are combined to produce an eight bit VRAM output used as an address for the video driver chip look-up table. The output bus connections for the VRAM buffer effect the combination of separate VRAM buffer image intensity information items by combining eight bits from a first buffer region containing information as to the first stored image with eight bits containing information as to the second stored image, with the first four bits and the last four bits of each eight bit set corresponding to corresponding pixel locations of the two images. Thus, two four bit nibbles corresponding to the same pixel location are combined or blended to produce a single eight bit address for entry into the look-up table to produce corresponding blended pixel information for output blended images.

In summary, the VRAM buffer output produces addresses for a look-up table in a video driver chip which contains pixel state information for a gray scale or color tone representation of points of a blended image combining the first and second images. The combined or "blended" image is presented on a computer display screen. The method of the invention includes storing a first image to be blended in a first VRAM buffer and storing a second image to be blended in a second VRAM buffer. The blending mechanism includes the process of loading the respective VRAM buffers with component nibble-sized contributions of information representing first and second gray level or color tone indications representative of corresponding pixel portions of the respective first and second images. The output of the VRAM buffers combines these contributions of the respective first and second images to produce an address to a look-up table which produces at that particular address location a blended gray level or color tone representative of a blending of the two gray levels or color tones.

The invention provides for the blending of first and second images loaded into corresponding VRAM buffers. The first and second images may, for example, be opaque and translucent images or windows displayed on a computer display screen. According to the invention, the blending of image data is effective for producing a combined image on the display screen of a computer screen assembly by first storing respective first and second images, such as for example, video and overlay images, in corresponding first and second VRAM buffers, combining pixel amounts thereof in a blending operation which combines nibble or byte contributions from each of the images to be blended, and addressing a preestablished look-up table in a CSC chip in order to establish the character of single pixel presentation on a computer screen. The VRAM buffer is loaded byte by byte, each byte comprising first and second nibbles representing image contributions for successive pixels "A" and "B." As a result of the indicated information scheduling activity, the first image information on a particular pixel will be in a particular one of the VRAM buffers and the corresponding second video information, i.e., the overlay information, is in the other VRAM buffer. After completion of blending operation, the CSC chip is called for addressing a color or gray scale look up table fabricated as part of the video driver circuitry. The color look-up table is a preferred version of the invention in which the color look-up table controls the color in pixels within a selected frame being displayed on a computer screen. According to an alternate embodiment of the invention, gray scale information is selected by the blending output to produce frame pixel information for presentation on a computer screen.

The loading of pixel information as to the respective first and second images is accomplished preferably in four bit segments along an eight bit input data bus connected to one or more VRAM buffers. A preferred version of the invention calls for loading two pixels of information at a time into separate VRAM buffer locations along the eight bit input data bus. A pixel of information could alternatively be expressed as an eight bit segment. However, to blend two eight bit segments of intensity information according to the scheme of the invention would produce a sixteen bit address for the look-up table. To allow for all possible intensity combinations according to this approach would not conveniently allow for the direct addressing of the color look-up table, which preferably contains 256 bits in each column. If direct addressing is desired for a 16 bit address, a much larger look-up table would have to be employed, which consumes large amounts of chip real estate and becomes very costly. Separate VRAM buffer locations are established to enable convenient switching from one buffer location to another with the use of a predetermined address bit line being connected to a buffer select circuit according to the invention herein. The buffer select circuit enables a first buffer location if the predetermined address bit is high, and enables a second buffer location if the predetermined address bit line is low. The remaining bits of the addresses are applied directly by the display driver chip during loading. This approach establishes a numerical correspondence between corresponding pixels of the overlapping first and second images, with the only difference between the addresses of corresponding pixels being the predetermined bit. By presetting the look-up table with blending information according to the invention herein, the CPU is freed up from computing the blending result. By taking the hardware approach, the CPU software overhead is considerably reduced. According to a preferred version of the invention, the predetermined bit is a final or highest order bit of a selected bit series used for addressing VRAM buffer locations.

These and other advantages of the present invention will become apparent upon reading the following detailed descriptions and studying the various figures of the drawings.

DETAILED DESCRIPTION OF THE PREFERRED EMBODIMENTS

Figure 1:
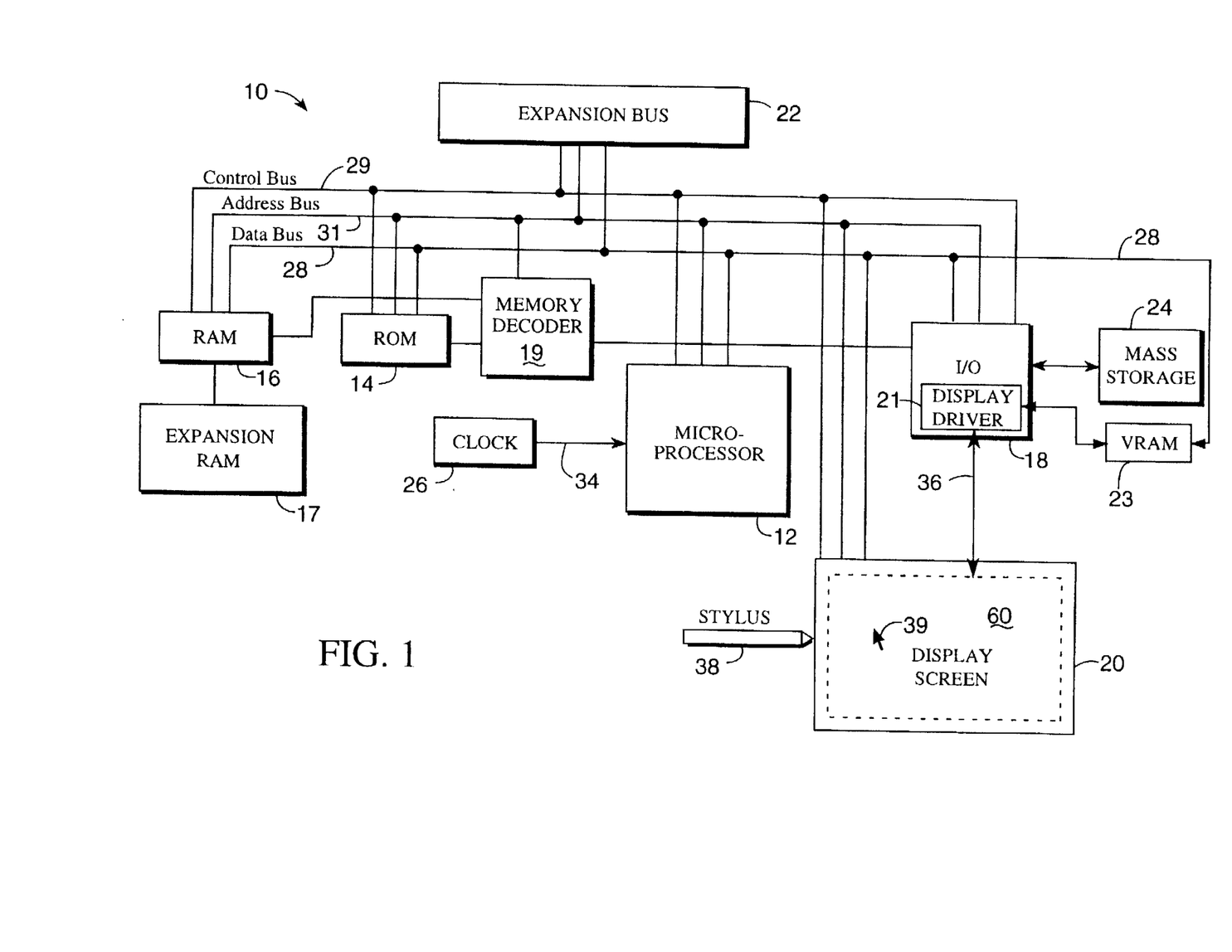
FIG. 1 is a block diagram of a computer system that implements the present invention.

As shown in FIG. 1, a computer system 10 in accordance with the present invention includes a central processing unit (CPU) 12, read only memory (ROM) 14, random access memory (RAM) 16, expansion RAM 17, input/output (I/O) circuitry 18, memory decoder 19, display assembly 20, and expansion bus 22. The computer system 10 includes a mass storage unit 24 such as a disk drive unit or nonvolatile memory such as flash memory and a real-time clock 26. The CPU 12 is preferably a commercially available, single chip microprocessor, such as the 68040 microprocessor available from Motorola, Inc. CPU 12 is coupled to ROM 14 by a data bus 28, control bus 29, and address bus 31. ROM 14 contains the basic operating system for the computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices. RAM 16, ROM 14, I/O circuitry 18 and microprocessor 12 are additionally connected to a memory decoder 19 effective for reading from and writing to appropriate, selected memory locations under the direction of CPU 12.

I/O circuitry 18 typically includes a number of latches, registers, direct memory access (DMA) controllers and a display driver 21 that controls the images displayed on display screen 60. The purpose of I/O circuitry 18 is to provide an interface between CPU 12 and such peripheral devices as display screen assembly 20 and mass storage 24. The display driver 21 is arranged to access and control video random access memory (VRAM) 23 which stores the images to be displayed. According to another version of the invention, DRAM (i.e., dynamic RAM) can substitute for the VRAM applications indicated herein. The VRAM receives data directly from the Data Bus 28. The display driver 21 communicates directly with the Data, Address and Control Buses, respectively 28, 31, and 29, through the control of memory decoder 19.

Display assembly 20 of computer system 10 is both an input and an output device. Accordingly, it is coupled to I/O circuitry 18 by a data bus 36. When operating as an output device, the display assembly 20 receives data from I/O circuitry 18 via bus 36 and displays that data on a suitable screen. Display assembly 20 includes a display screen 60 which can be a liquid crystal display (LCD) of the type commercially available from a variety of manufacturers. The input device ("tablet") of a preferred display assembly 20 in accordance with the invention can be a thin, clear membrane or tablet overlay 20' which covers the LCD display and which is sensitive to the position of a stylus 38 on its surface. Tablet overlay 20' communicates with and is driven by a table overlay controller 20", which in turn communicates with I/O circuitry 18. Among the activities of the tablet overlay controller 20" is to take inputs from stylus 38 and send them to CPU in microprocessor 12. The tablet alternatively can be an embedded RF digitizer activated by an "active" RF stylus. Combination display assemblies are available from a variety of vendors. Other types of user inputs can also be used in conjunction with the present invention.

While the method of the present invention is described in the context of a pen system, other pointing devices such as a computer mouse, a track ball, or a tablet can be used to manipulate a pointer or a cursor 39 on a screen of a general purpose computer. Therefore, as used herein, the terms "pointer," "pointing device," "pointer inputs" and the like will refer to any mechanism or device for pointing to a particular location on a screen of a computer display. Some type of mass storage 24 is generally considered desirable. However, the mass storage 24 can be eliminated by providing a sufficient amount of ROM 14, RAM 16 and expansion RAM 17 to store user application programs and data. In that case, RAMs 16 and 17 can be provided with a backup battery to prevent the loss of data even when the computer system 10 is turned off. However, it is generally desirable to have some type of long term storage 24 such as a commercially available miniature hard disk drive, nonvolatile memory such as flash memory, battery-backed RAM, PC-data cards, or the like.

In operation, information is input into the computer system 10 by "writing" on the screen of display assembly 20 with stylus 38. Information concerning the location of the stylus 38 on the screen of the display assembly 20 is input into the CPU 12 via I/O circuitry 18. Typically, this information comprises the Cartesian (i.e., x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen. Expansion bus 22 is coupled to the data bus 28, the control bus 29, and the address bus 31, similar to the other components in system 10. Expansion bus 22 provides extra ports to couple devices such as modems, coprocessors, and other I/O devices, etc., to the CPU 12.

The object of the present invention is to display two overlaid images such that the images can be simultaneously discerned by the user. This is accomplished by storing the two images in separate VRAM buffer locations. When it comes time to transmit a display signal to the display assembly corresponding to a selected display pixel, the information stored in the first and second image buffers that correspond to the selected pixel are combined to form an address to a look-up table. The value stored in the look-up table is used as the display signal that is passed to the display.

Figure 2:
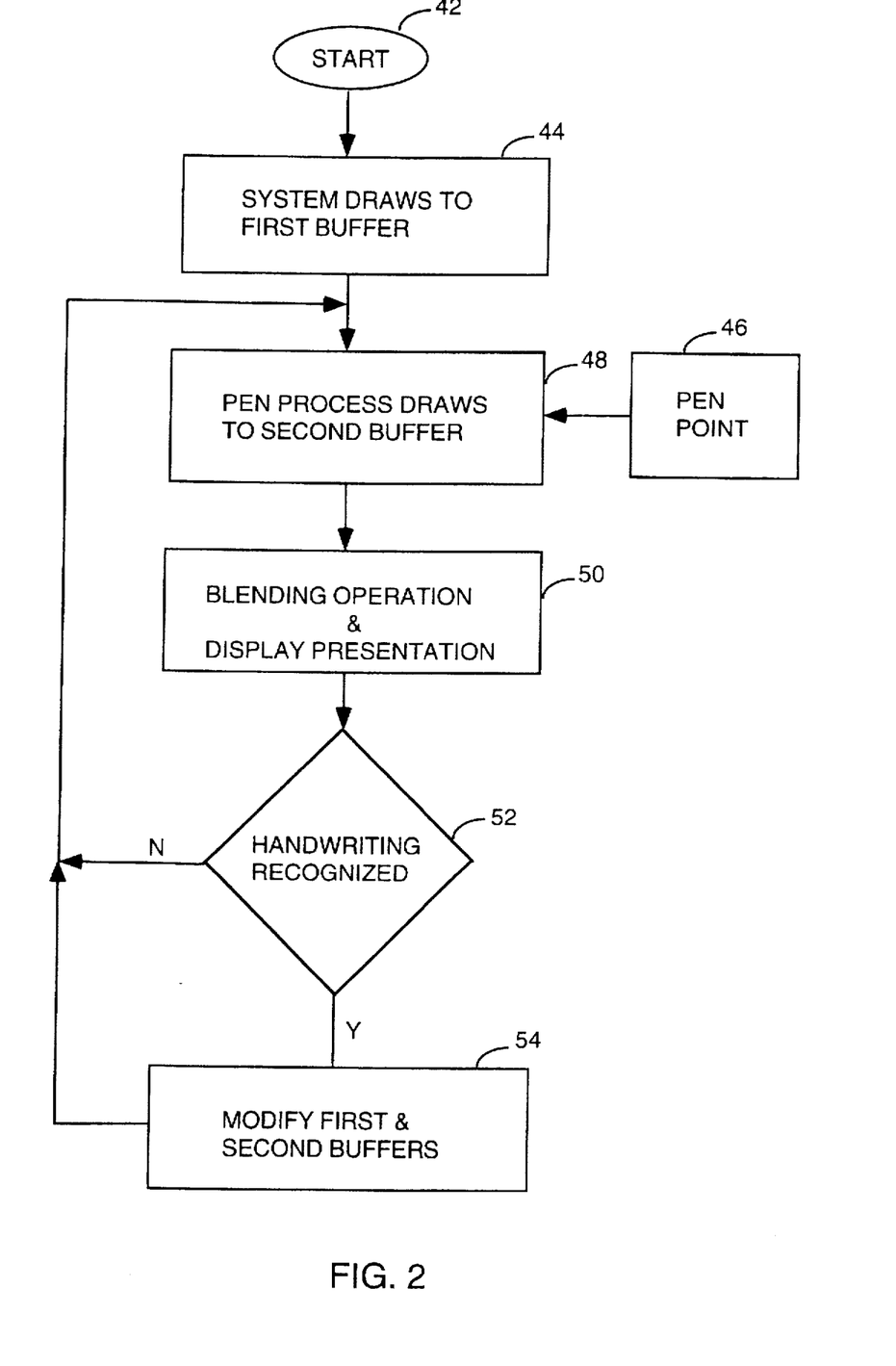
FIG. 2 is flow diagram illustrating a process for storing pen and application/system generated images in VRAM to accommodate blending in accordance with the present invention.

Referring next to FIG. 2, the process of loading the first and second images into the VRAM will be conceptually described. Particularly, the described process relates to a system in which pen inputs written on the screen will be translucently displayed over an open window or other image generated by the computer system. The process begins at step 42. The active application program or the system initially determines whether any images or windows are to be displayed in step 44. When an image is to be displayed, either the system or an active application stores a first image in a video buffer. The type of image created will vary widely with the computer system employed. However, by way of example, it may be a graphical user interface standing alone, or with open windows, folders documents etc. displayed thereon. The video buffer typically takes the form of VRAM. If a pen input is received, (as determined in step 46) the logic will continue to step 48. Otherwise, the system or application will retain control and further modifications may be made to the image stored in the first buffer. At some point, (step 46) the user may use the pen to input additional information into the computer system. The pen inputs are treated as a separate image and are stored in a second video buffer in step 48. Again, the video buffer is typically VRAM (although this is not a requirement). The first and second buffers may be within the same VRAM chip, or in separate chips.

The two images are then effectively blended in step 50 and a blended image is displayed on the display screen. Suitable devices for performing this portion of the process will be described in detail below. Typically, after a pen input has been received, an attempt is made to recognize the input (step 52). If the input is not recognized, the process returns to step 48. On the other hand, if the pen input (or a portion thereof) is recognized, the recognized portion is passed to the currently running application or the operating system where it is interpreted. The interpretation may cause the execution of a command, the entering of a graphic item, the addition of textual material or any other suitable activity. Such activities may cause a change in the desired display, which would be implemented by modifying the first buffer accordingly. After a pen input has been recognized, the recognized portion will be deleted from the second buffer. After the changes have been made to the buffer, the process would return to step 48 where it awaits the next input.

The process described above with respect to FIG. 2 has been described as though it flows sequentially. Such a description was provided in order to facilitate a better understanding of the invention. However, in practice the described functions may be carried out in different orders and rather than being sequential in nature may be executed in parallel and/or may be interrupt driven. By way of example, pen inputs are typically received only after a hardware interrupt is generated when the user places the stylus 38 against the screen 42. The hardware interrupt gives control of the CPU 12 to the described routine.

Figure 3A:
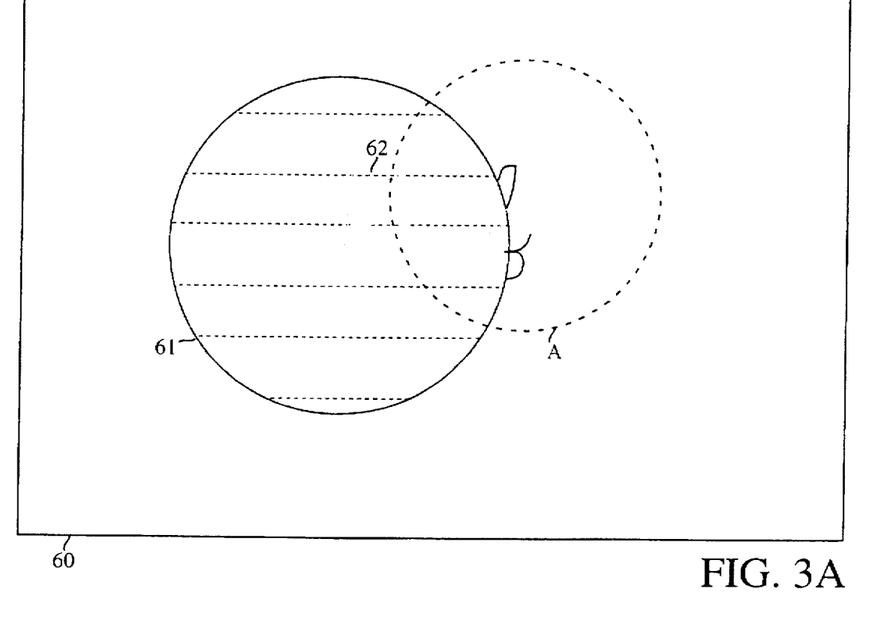
FIGS. 3a & 3b illustrates a video display screen with a pair of overlapping images shown on the screen, including an overlaying image which has been rendered translucent, and a base image partially overlapped by the overlaying image.

FIG. 3a illustrates an example of a combined image which may be presented on display screen 60. The two images combined are respectively a circle image 61 produced by an application program and a second image 62 presented in the form of a handwritten representation of a word, the name, "Bob", that was entered by pen. The circle image 61 is shown centered within the field of display screen 60, and the interior of this image is shaded. By way of example, when the monitor is a gray scale monitor, the shading may be a gray scale image. When a color monitor is used, the shading may be any suitable color. In the embodiment shown, the region outside of the circle is blank.

The second image 62 is the name, "Bob," established in handwritten form and beginning with a capital "B." Both of the first two letters, the capital "B" and the small case "o" are completely within the shaded circle. However, the final letter, "b," in the name, "Bob," is partially within the circle and partially outside the circle. The script produced in handwriting has a predetermined width or thickness in the two dimensions in which it is drawn. This is shown effectively in the partial blow-up of the figure shown as FIG. 3b. The script provided has a predetermined initial tone or gray scale intensity. The interior of the circle further defines another predetermined initial tone or gray scale intensity level. As a result of blending operation, the initial tone intensity of the script is combined with the several intensity levels of the regions over which it is applied. According to one approach, the portion of the script which overlies the blank region outside the circle could be blended to maintain the same intensity level as before, because it is combined with a blank intensity level, and common sense might suggest that maintaining the same intensity level for that part of the script as before would be desirable. This preferred outcome of blending is however not the only outcome which falls within the scope of this invention. The actual outcome or resultant intensities are a matter of choice by the user or the operating system.

Figure 3B:
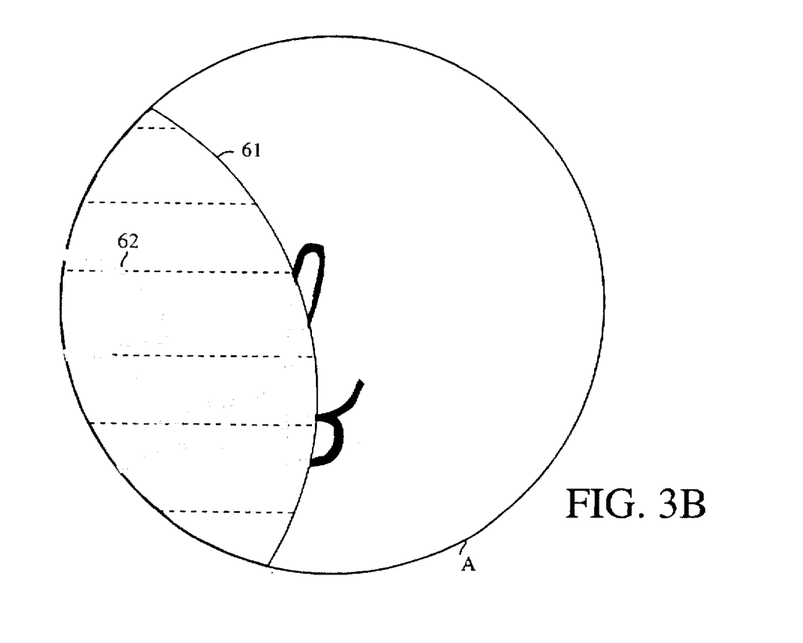

With respect to the example actually shown, it is particularly indicated as well what the result of blending according to a preferred version of the invention would be for the region of gray within the circle when combined with the intensity of the script. In this case, the script blended with the gray background produces a desired gray intensity level which in this instance is different from the resultant intensity outside the circle region where the script is shown.

Figure 4A:
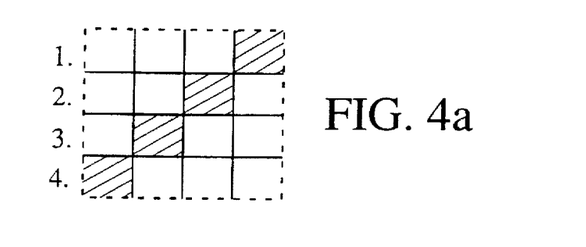
FIGS. 4a–4f illustrate a computer-implemented blending process according to which images or windows are combined in overlapping regions thereof for presentation on a computer display.
Figure 4B:
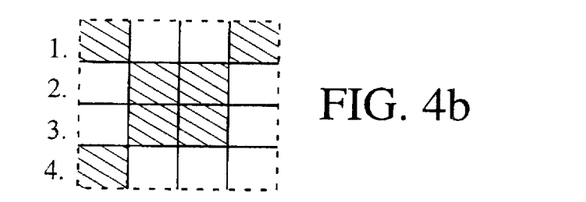
Figure 4C:
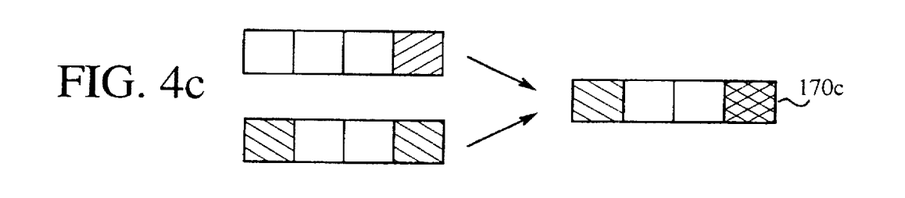
Figure 4D:
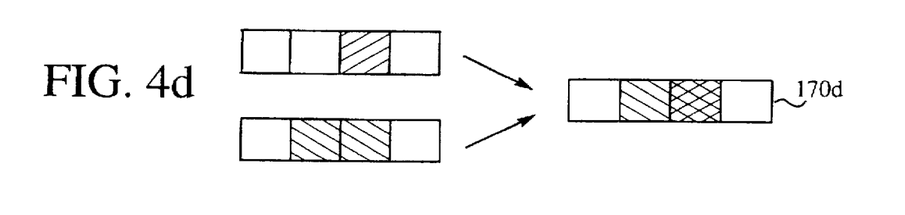
Figure 4E:
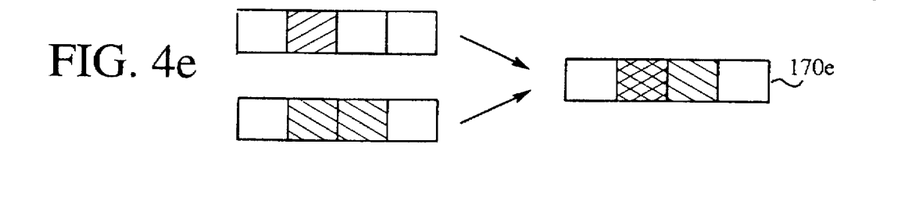
Figure 4F:
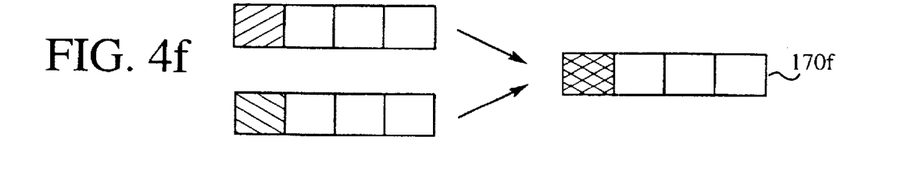

FIGS. 4a–4f are used, as an example, to further explain the process of FIGS. 3a and 3b. FIG. 4a represents an example of the pixel states within a selected four-by-four grouping of pixels from the first video image buffer to be presented on display screen 60. This four-by-four pixel grouping has been divided into 16 individually-blendable pixel units. These pixel units are arranged in a four-by-four matrix, where the rows have been numbered 1, 2, 3, and 4. FIG. 4b illustrates the same four-by-four pixel grouping taken from the second video image buffer, and again has 16 individually-blendable units formed in a four-by-four array, with the rows numbered 1, 2, 3, and 4. In FIG. 4c, the row 1 from FIG. 4a and row 1 from FIG. 4b are blended together to form a blended row 170c. In FIG. 4d, rows 2 from FIGS. 4a and 4b are blended together to form a blended row 170d. In FIG. 4e, rows 3 from FIGS. 4a and 4b are blended together to form a blended row 170e, and in FIG. 4f rows 4 from FIGS. 4a and 4b are blended together to form a blended row 170f. This "blending" process allows a base image on the display screen 60 to be seen through a translucent overlay image produced by the user. It should be appreciated that the tone intensity (or color) of the output is not necessarily directly proportional to the tone intensity (or colors) of the overlapping images. Rather, as will be explained in more detail below, the blended output for any selected pair of overlaid tone intensities may be preselected to any level.

Figure 5:
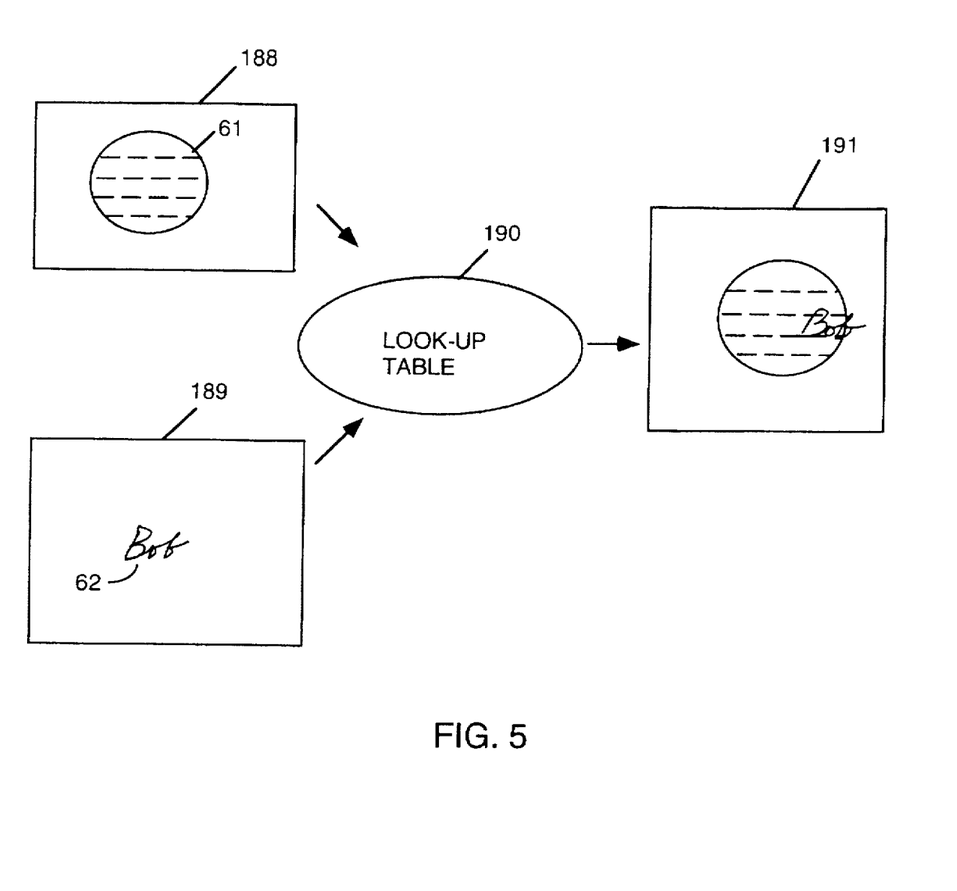
FIG. 5 illustrates the basic concept of image blending which is effective for combining overlapping portions of the base and overly images, which is implemented with the circuitry of the invention herein.

FIG. 5 illustrates an overview of how the blending process indicated above is accomplished. A look-up table 190 is used to combine the contents of first and second VRAM buffers on a pixel by pixel basis to produce a composite image 191, which is more fully detailed in FIG. 3a. The contents of the buffers are represented visually as first and second images 188 and 189. In particular, the first VRAM buffer 308 is provided with first image information as to image 188, which is a gray image circle set at a first selected gray level at the center of a blank field within a selected window region. The second VRAM buffer 310 contains the handwritten script image of the name, "Bob". By virtue of an addressing scheme to be discussed in detail below, the respective images loaded into VRAM buffers 308 and 310, namely images 188 and 189, are blended by look-up table 190 to produce a resultant blended image 191, which is the blended image shown in greater detail in FIG. 3a.

Figure 6:
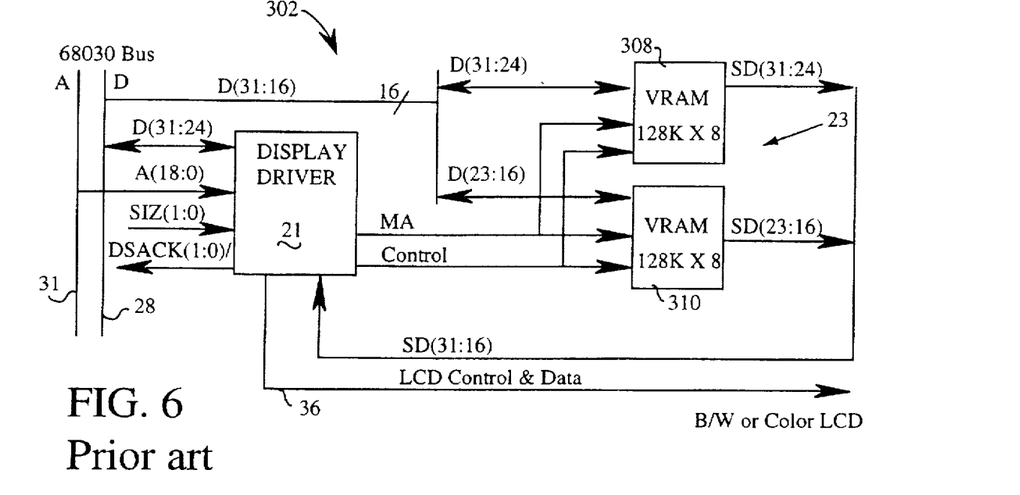
FIG. 6 illustrates a prior art video driver circuit.

FIG. 6 shows a conventional video driver system of a prior art Macintosh computer system. In this example, a video driver circuit 302 is coupled to address bus 21 and data bus 28 connected to microprocessor 12. The video driver circuit 302 includes a color screen controller (CSC) or display driver 21, and two banks of VRAM buffers 308 and 310. The display driver 21 produces LCD control and data signals on a bus 36 which for example controls a black and white or color liquid crystal display (LCD). For example, the video driver circuit 302 can drive an Esher LCD circuit for a 640 by 400 bit display, with eight bits of information per pixel.

Figure 7:
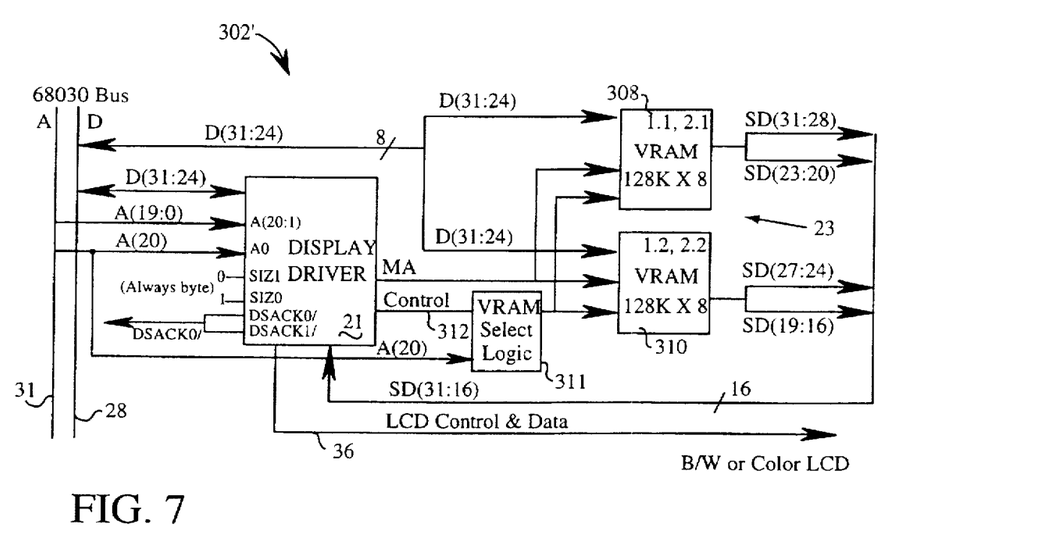
FIG. 7 illustrates video driver circuitry in accordance with the present invention.

FIG. 7 is used to illustrate a preferred embodiment of the present invention wherein the blending of base and overlay images is performed in a hardware intensive fashion. In FIG. 7, a modified video driver circuit 302' is coupled to address bus 31 and data bus 28, and includes a display driver 21, VRAM 308, VRAM 310, and VRAM select logic circuit 311. In this implementation, data are input into the VRAM of modified video driver circuit 302', and combined therein to provide LCD control and blended data on bus 312. Video driver circuit 302' controls either a black and white or color LCD, except instead of having eight bits per pixel, there are four bits allocated to the base image and four bits allocated to the overlay image. A color look-up table (CLUT) within display driver 21 is loaded with 256 entries which detail each possible combination of bits from the 4 bit screen and the 4 bit overlay images and dictate what the resultant blended value is. The color capability of the display driver 21 is therefore not only used for color look-up, but also used for the blending values This technique makes it possible to use off-the-shelf integrated circuits, such as the display driver 21 which is available from Chips & Technologies, Inc. of San Jose, Calif., to perform an entirely new operation. CSC chip 21 is effective for controlling the loading VRAM buffers 308 and 310. Control is exercised along MA line and through VRAM select logic circuit 311. Address line A(20) is employed to toggle data input to one or the other of VRAM buffers 308 and 310.

To discuss the details of the wiring scheme shown, line A(20) of address bus 31 is directly connected to VRAM select logic 311, which in turn selects which of VRAM buffers 308 and 310 is to receive data along the eight bit data lines D(31:24). If the bit state of address line A(20) is high, a first one of VRAM buffers 308, 310 will be enabled to receive data from lines D(31:24). According to a preferred version of the invention, these eight bits of data represent color or gray scale intensity information as to two separate pixels of information. VRAM select logic circuit 311 accomplishes the selection of the appropriate one of VRAM buffers 308, 310 according to control signals received along a control line 312 from display driver 21. The specific address numbers used for particular VRAM buffers 308, 310 can be determined according to user selection. According to one approach, as will be shown below with reference to FIG. 8b, address locations $6010 0000 through $6013 FFFF are allocated to a first one of VRAM buffers 308, 310, and address locations $6000 0000 through $6008 FFFF are allocated to the other one of VRAM buffers 308, 310. To represent these hexadecimal numbers in binary code, it is clear that this number of address locations requires 21 binary positions. According to a preferred version of the invention, the 21st address bit is accordingly reserved to locate all of the image information as to a first image to be blended in the same one of buffers 308, 310 and all information as to the second image to be blended in the other one of the buffers 308, 310. This image allocation is accomplished by connection of address line A(20), i.e., the 21st address line directly to specialized VRAM select logic circuit 311.

VRAM loading and image blending process according to the invention is conducted as follows. First, buffers 308 and 310 are initialized and loaded at each 8-bit, i.e., byte-sized, location with image intensity data for first and second images to be blended. Each 8-bits of information represent image information as to first and second pixels, with the intensity level information as to each of the indicated pixels being contained in four bits of information, according to a preferred version of the invention. With these four bits, 16 different gray scales or color intensity levels can be expressed. According to another version of the invention, eight bits of information could be used for a single pixel to represent 256 different gray scale or color intensity levels. However, this would require a much bigger look-up table, which may be unacceptable for many applications according to the current state of the technology. However, for some current applications and as the technology develops, larger look-up tables may become desirable. Actual blending operation is conducted on a pixel-by-pixel basis with reference to use of a color look-up table 360. Loading of buffers 308 and 310 is accomplished at selected times as to the entire contents of buffers 308 and 310. More frequently, only one of VRAM buffers 308, 310 is subject to modification, either, for example, by a selected applications program loading a new image into one of VRAM buffers, for blending operation, or, alternatively, by the user making a change in a selected image entered into the other of the two VRAM buffers 308, 310.

The blending process calls for the loading of respective VRAM banks 308 and 310 with 4 bits each reflecting base image video information for pixels "A" and "B." The information provided may thus first define video data reflecting the base image as to selected first and second selected pixels, each of them having level or tone represented in 4 bits, but the combination of two pixels being defined jointly in 8 bits. All the pixel information as to a particular image need not be loaded into the same VRAM buffer 308 or 310. The information can be staggered. However, if such staggering is conducted, accommodation for the staggering needs to be made in display driver 21, as for example by having multiple color look-up tables, one associated with staggered VRAM buffer loading.

Figure 8A:
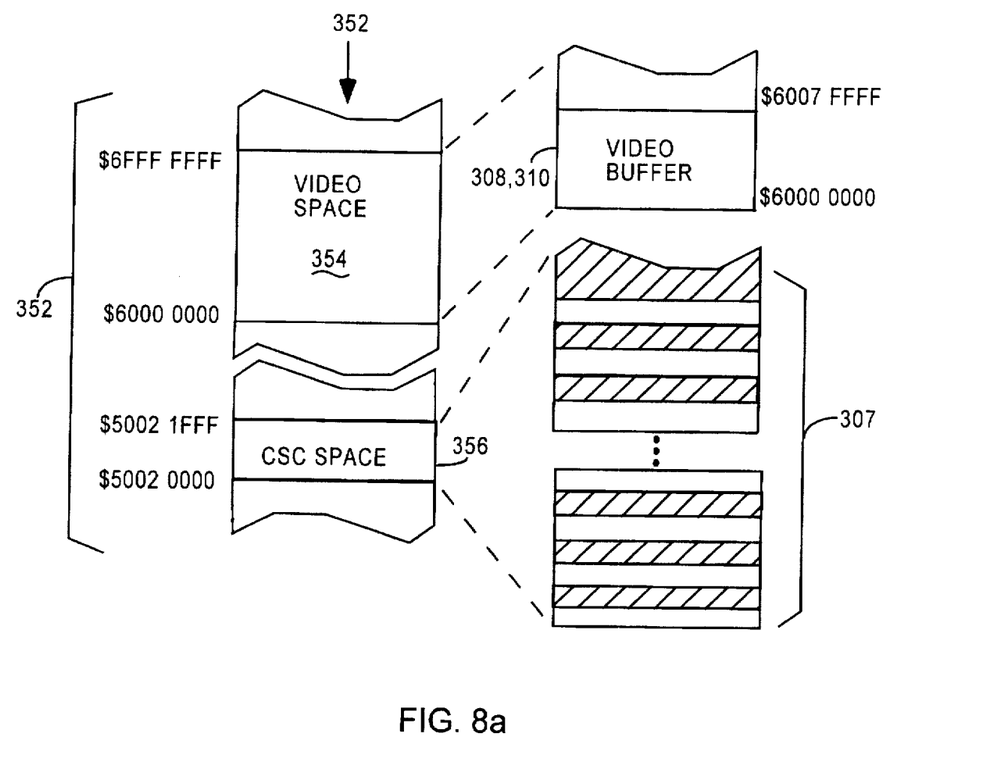
FIG. 8a illustrates a memory map for image information loaded into a VRAM buffer of the prior art.

FIG. 8a illustrates a memory map for video and CSC information which can be used with respect to presentation of pixel information on the computer screen, according to the prior art. In particular, FIG. 8a shows a memory region 352 associated with the CPU. Memory region 352 includes subregions 354 and 356 respectively allocated to first video information as to a particular image and also information specific to CSC operation in making pixel frame presentations to the computer display, as will be seen. In particular, video space 354 includes CPU memory locations $6000 0000 to $6FFF FFFF. CSC memory space 356 extends from memory locations $5002 0000 to memory location $5002 IFFF. The corresponding video (i.e., VRAM) buffer locations extend from $6000 0000 to $6007 FFFF. The entire amount of video information is provided to video buffer hardware, in this case to VRAMs 308 and 310, as seen in FIG. 8a. The CSC information is provided to other, selected staggered memory locations within CSC chip 307. Control over placement of image information at selected memory locations is managed by CPU 12 and memory decoder 19, as suggested in FIG. 1, and as would be understood by one skilled in the art.

Figure 8B:
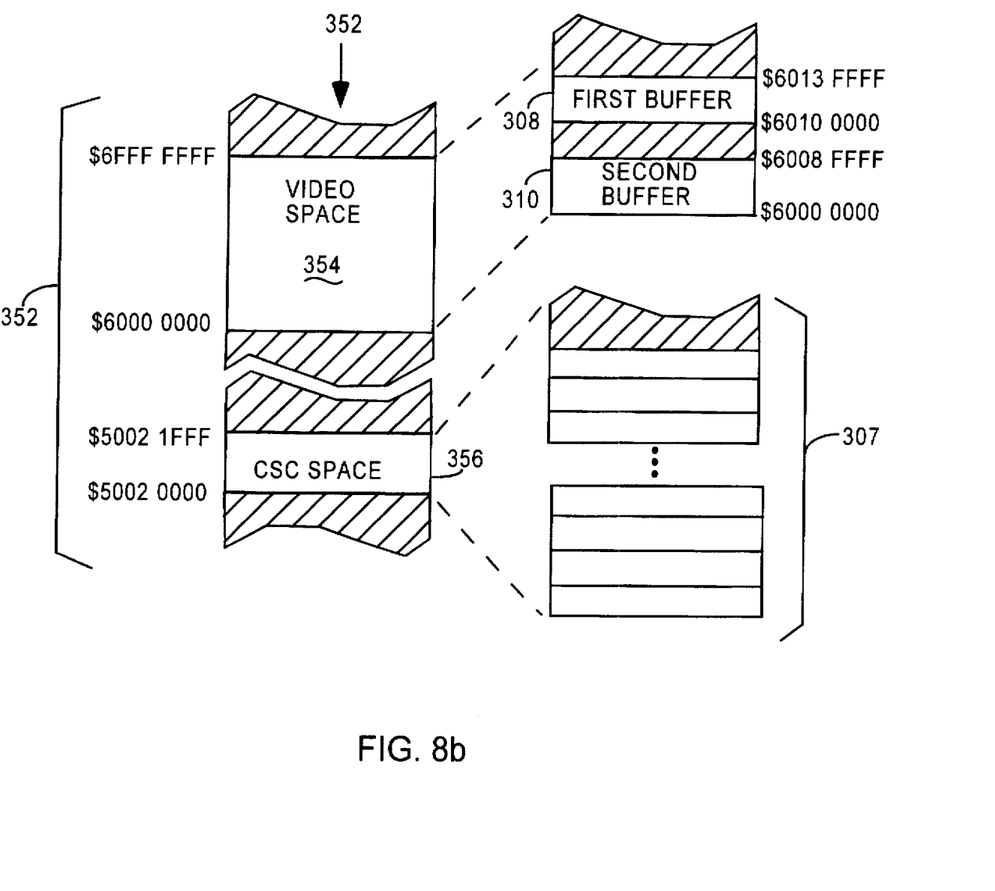
FIG. 8b illustrates a memory map for image information according to the present invention.

FIG. 8b illustrates a memory map for image and CSC information according to the present invention, wherein the CPU has direct control over the placement of image information in VRAM buffers. As in FIG. 8a, memory region 352 includes subregions 354 and 356 respectively allocated to first image information as to a particular image and also information specific to CSC operation in making pixel frame presentations to the computer display. However, according to one version of the invention, the image information comes in two kinds, first image information as to a base image, and second image information as to an overlay image. Accordingly, the information may be segregated in any one of a number of ways. According to one version, all of the first image information, i.e., that dealing with the base image, can be allocated to VRAM buffer 310. Concomitantly, all of the second image information, i.e., that dealing with the overlay image, can be allocated to the other VRAM buffer 308. Other variations are workable as well. For example, the first and second images can be interspersed within the VRAM buffers 308 and 310, so long as they are organized suitably to be available pixel-by-pixel (or by pixel pairs) for blending operation and presentation on the computer display as part of an image frame.

Figure 9:
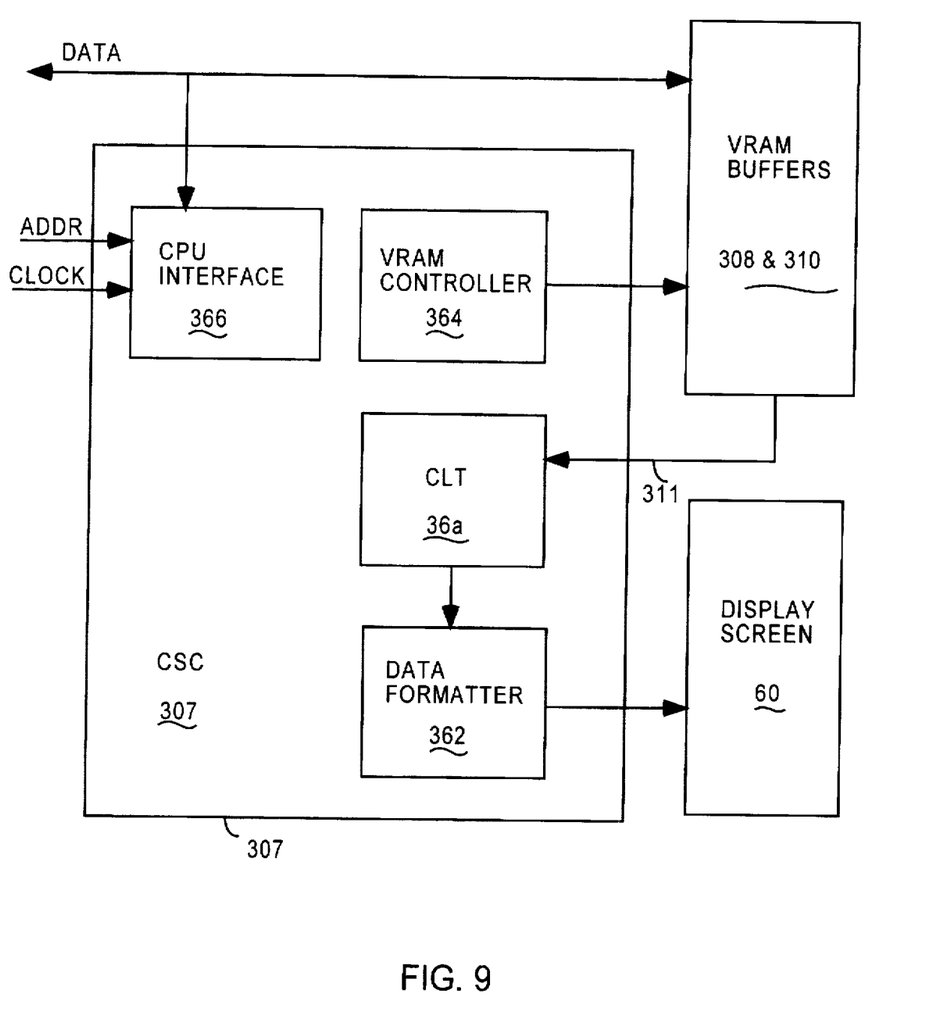
FIG. 9 illustrates features of a CSC chip which includes a color look-up table according to a preferred version of the invention in which the color look-up table controls the color in pixels within an image frame being displayed on a computer screen.

FIG. 9 illustrates features of CSC chip 307 including a color look-up table (CLUT) 360, data formatter 362, VRAM controller 364, and CPU interface 366. According to a preferred version of the invention, the color look-up table 360 controls the color in pixels within a selected frame being displayed on a computer screen. Further according to the invention, color look-up table 360 is addressed by an 16 bit line from VRAM buffers 308, 310. This 16 bit line permits addressing of 256 locations on color look-up table 360 as to first and second pixels. Color look-up table 310 can accordingly permit reference to a broad number of pixel colors for presentation to the computer screen viewer. If the computer screen is black and white and permits the presentation of gray scale images, these various desired levels of gray can conveniently be represented in order appropriately to drive the computer display. Depending upon whether an analog or digital signal is desired from the look-up table, the output of the look-up table 310 can be channeled appropriately through data formatter 362 directly to LCD control and data ports of the external display assembly for presentation on a computer screen or monitor, as would be understood by one skilled in the art. VRAM controller 364 is effective for calling appropriate pixel locations in VRAM buffers 308 and 310 for application to color look-up table 360 along line 311.

Figure 10:
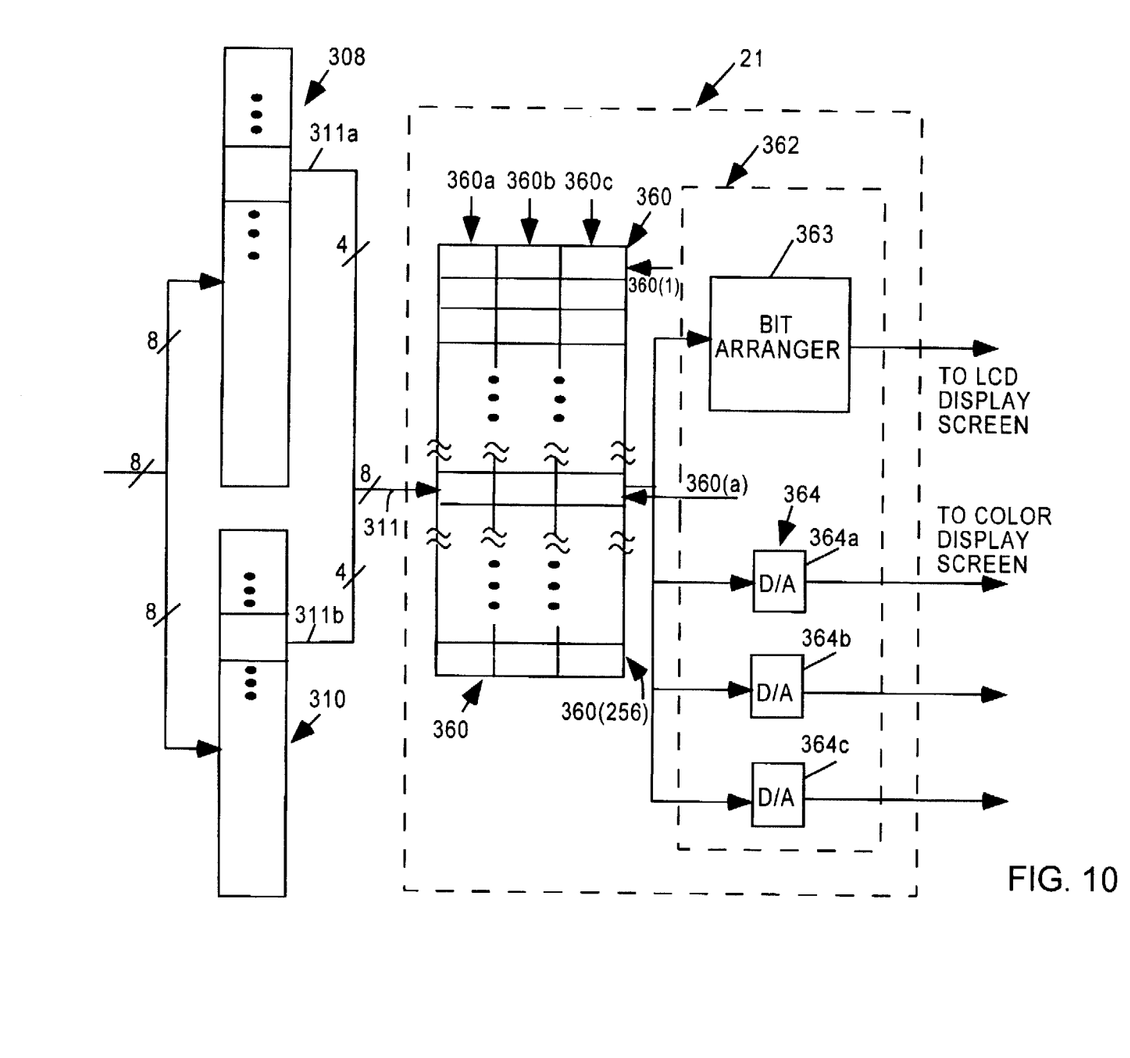
FIG. 10 illustrates, in block diagram form, circuit details of VRAM buffer addressing of the color look-up table used to implement the invention herein, and control of image presentation on a computer display screen based upon entries into the color look-up table.

FIG. 10 illustrates, in block diagram form, details of VRAM buffer addressing of the color look-up table 360 in display driver 21, and control of image presentation on computer display screen 60 based upon entries into color look-up table 360. In particular, look-up table 360 has an array of columns respectively 360a, 360b, and 360c to contain information components about intensity or tone of color according to each of the basic colors, red, green, and blue. The vertical axis of the look-up table is broken into 256 rows, each of them having three slots to represent the indicated color intensity spectrum as weighting factors. A particular eight bit address produced by VRAM buffers 308 and 310 is effective for selecting one of the address locations 360(n) of color look-up table 360. As noted above, this address selection accomplishes a blending of tone information as to a particular pixel, as the eight bit address represents a particular gray scale level or color tone which has been selected to correspond to a particular combination of two other gray scale levels or color tones respectively represented by four bits each. These respective four bit sets are respectively derived from the two VRAM buffers 308 and 310. Once a particular address location, e.g., 306(n), has been selected, three entries in table 360 from respective columns 360a, 360b, and 360c, are designated to be forwarded to bit arranger 363 and first, second, and third corresponding digital to analog (D/A) converters 364, respectively 364a, 364b, and 364c. Whether a corresponding output from bit arranger 363 or analog to digital converters 363 is forthcoming depends upon whether there is connected to display driver 21 a computer display screen 60 of the LCD display screen type or the color video display screen kind.

Thus, according to the invention, there is a mechanism for blending first image data and second image data to produce a blended image on the screen assembly by first storing image and overlay information in VRAM buffers 308 and 310, combining pixel amounts thereof in blending operation, and addressing a preestablished look-up table 360 in display driver 21 in order to establish the character of single pixel presentation on computer screen 60 in accordance with the results of blending operation. The VRAM buffers 308, 310 are loaded by applying selected bit amounts of first image information about selected, successive pixels "A" and "B" in separate VRAM buffers, such that the first image information about pixel "A" is entered in one of the VRAM buffers and the first image information about pixel "B" is entered in the other one of the VRAM buffers. Next, the second image information about pixels "B" and "A" is loaded onto the same respective, separate ones of VRAM buffers 308 and 310. As a result of this scheduling, the first image information on a particular pixel is in one of the VRAM buffers 308, 310 and the corresponding second image information, i.e., the overlay information, is in the other VRAM buffer. Further, according to the invention, all the data on a particular pixel is provided for blending operation by addressing both of the VRAM buffers 308, 310 to produce complete image and overlay information about a particular pixel concurrently. After completion of blending operation, the display driver 21 is called for addressing a color or gray scale look up table 360. The color look-up table 360 is a preferred version of the invention in which the color look-up table 360 controls the color in pixels within a selected frame being displayed on computer screen 60. According to an alternate embodiment of the invention, gray scale information is selected by the blending output to produce frame pixel information for presentation on computer screen 60.

In summary, the circuitry according to the invention herein, and as explained with reference to FIGS. 7, 8a, 8b, 9, and 10 permits the receipt along data bus 28 of image information as to first and second images to be blended. The image information is accompanied by address information which identifies data on data bus 28 as belonging either to the first or the second image. Further, a selected bit line of address bus 31 is selected to provide an indication as to whether a particular data item belongs to the first or the second image. According to one version, address line A(20) is assigned to identify the particular image. The data identified is applied to either VRAM buffer 308 or VRAM buffer 310, depending upon the state of address line A(20). For example, if the state of address line A(20) is "1," then the data from data bus 28 is provided to VRAM buffer 308. Alternatively, if the state of address line A(20) is "0," the data from data bus 28 is provided to VRAM buffer 310. More particularly, the data from data bus 28 is connected along data lines D(31:24) to both of VRAM buffers 308 and 310. Each of VRAM buffers 308 and 310 is connected to a select line from VRAM select logic circuit 311. According to one version, VRAM select logic circuit 311 selects VRAM buffer 308, if the input to VRAM select logic circuit 311 is a "1" along address line A(20). If the input to VRAM select logic circuit 311 is a "0" along address line A(20), then VRAM select logic circuit 311 is effective for selecting VRAM buffer 310. Thus, while data lines D(31:24) are connected to both VRAM buffers 308 and 310, data from data lines D(31:24) will be input only into the selected one of VRAM buffers 308 and 310. The actual data provided according to one version comes in eight bit amounts. These eight bits can represent data as to a single pixel or according to a preferred version, the first four bits represent image data as to a first pixel and the next four bits represent data as to a next pixel. Four bits are sufficient to represent 16 levels or shades of intensity in terms of color or grayness as to a particular pixel. Eight bits, however, can represent 256 levels or shades of color or grayness. The output of VRAM buffers 308 and 310 is provided in terms of eight bits from each VRAM buffer. For example, VRAM buffer 308 provides eight bits of output data along lines SD(31:28) and SD(23:20), and VRAM buffer 310 provides eight bits of output data along lines SD(27:24) and SD(19:16). These data lines are combined as a single bus including lines SD(31:16). Lines SD(23:16) represent the blending of data from lines SD(23:20) from the image data of a first image stored in VRAM buffer 308 and data from lines SD(19:16) from the image data of a second image stored in VRAM buffer 310. Lines SD(31:24) represent the blending of data from lines SD(31:28) from the image data of a first image stored in VRAM buffer 308 as to a next pixel and data from lines SD(27:24). In this fashion, data is loaded into and extracted from VRAM buffers 308 an 310 in order to accomplish blending of two images.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. A pen-based computer system comprising:

a central processing unit (CPU);

a display assembly having an input tablet and a display screen;

a video memory responsive to said CPU for storing first and second image information sets corresponding to first and second images to be displayed on display screen, one of the first and second images corresponding to a handwritten image drawn on the input tablet; and a video driver for providing pixel state information, said video driver being connected to said video memory and being responsive to the first and second information sets in determining pixel states provided to the video display such that the pixel states provided are a function of both the first and second images, and said video driver includes a look-up table, and wherein the image information sets are presented as addresses to said look-up table and said look-up table produces the pixel states for the video display;

a recognizer for attempting to recognize the handwritten image, wherein when at least a portion of the handwritten image is recognized, said video driver operates to modify at least one of the first and second image information sets stored in said video memory.

2. The computer system according to claim 1, wherein the pixel states produced by said look-up table represent a blending of the first and second images.

3. The computer system according to claim 2, wherein said video driver includes a color and/or gray scale screen controller.

4. The computer system according to claim 2, wherein said first and second images stored in said video memory are represented by four bit nibbles, and wherein the video driver provides an output signal indicative of the intended illumination of specific pixels.

5. The computer system according to claim 1, wherein said look-up table includes a plurality of addressable locations containing image tone level indications for pixels to be displayed on the video display.

6. The computer system according to claim 5, wherein said look-up table is divided into a plurality of sections, and each section provides tone level information for an associated color.

7. The computer system according to claim 6, wherein said look-up table comprises three sections, representing the respective colors, red, green, and blue, and/or gray scale hues.

8. The computer system according to claim 1, wherein said video memory includes a plurality of video RAMs, and first and second images are stored in separate video RAMs.

9. The computer system according to claim 8, wherein said plurality of video RAMs store image information in pixel pairs.

10. The computer system according to claim 1, wherein said computer system further performs an activity in accordance with the recognized portion of the handwritten image.

11. The computer system according to claim 10, wherein the activity is the execution of a command.

12. The computer system according to claim 10, wherein the activity is the display of a graphic item on the display screen.

13. A method for blending first and second images to translucently overlay the images on a display assembly for a pen-based computer system, the display assembly having a display screen and an input tablet, the method comprising the steps of:

loading first image information having a predetermined number of pixels into a first buffer;

receiving a handwritten pen-based input on the input tablet of the display assembly, the handwritten pen-based input forming second image information having a corresponding predetermined number of pixels;

loading the second image information into a second buffer;

translucently combining said first and second images, respectively obtained from the first and second buffers, on a pixel-by-pixel basis to produce a blended image;

displaying the blended image on the display screen of the display assembly;

attempting to recognize the handwritten pen-based input; and when at least a portion of the handwritten pen-based input is recognized, deleting the portion from the second buffer and modifying the first image in the first buffer.

14. The method according to claim 13, wherein first and second images are combined to establish an address location in a look-up table containing resultant pixel state information representing the combination of first and second images.

15. The method according to claim 14, wherein the entries of the look-up table comprise intensity or color tone indications.

16. The method according to claim 13, wherein each entry of the look-up table includes at least an intensity or color tone for red, green and blue.

17. The method according to claim 16, wherein said first and second image information is combined to represent a four bit contribution from said first image information and a four bit contribution from said second image information.

18. The method according to claim 13, wherein said first image information is produced from an application program.

19. The method according to claim 13, wherein said second image information is provided by a user using a pen on the input tablet.

20. The method according to claim 13, wherein said method further comprises:

performing an activity in accordance with the recognized portion of the handwritten image when at least a portion of the handwritten pen-based input is recognized.

21. The method according to claim 20, wherein the activity is the execution of a command.

22. The method according to claim 20, wherein the activity is the display of a graphic item on the display screen.

23. A computer system, comprising:

a video display for displaying images;

an input tablet for receiving a handwritten input;

an address bus having a plurality of address lines;

a data bus having a plurality of data lines;

a first video buffer, operatively connected to said data bus, for storing pixel data associated with a first image;

a second video buffer, operatively connected to said data bus, for storing pixel data associated with a second image, the second image being formed from handwritten input;

a display driver, operatively connected to said address and data buses, for controlling the loading of first and second video buffers with the pixel data from the first and second images, respectively, and for outputting resultant pixel data to said video display;

a buffer selection circuit, operatively connected to said display driver, for selecting one of said first and second video buffers based on one of the address lines;

a look-up table for receiving corresponding pixel data from said first and second video buffers via the selection by said buffer selection circuit, and for combining the corresponding pixel data from said first and second video buffers to produce the resultant pixel data for the video display; and a recognizer for attempting to recognize the handwritten input, wherein when at least a portion of the handwritten input is recognized, said computer system operates to delete at least a corresponding portion of the second image from the second video buffer and modifying the first image in the first video buffer.

24. A computer system as recited in claim 23, wherein said look-up table translucently combines the corresponding pixel data to produce the resultant pixel data.

25. A computer system as recited in claim 23, wherein said look-up table includes entries correspond to the resultant pixel data, and wherein said look-up table is addressed with the pixel data received.

26. A computer system as recited in claim 25, wherein the entries of said look-up table comprise intensity or color tone indications.

27. A computer system as recited in claim 25, wherein each entry of said look-up table includes at least an intensity or color tone for red, green and blue.

28. A computer system as recited in claim 23;

wherein said display driver includes said look-up table; and wherein the pixel data are stored as sets of pixel data to said video buffers, the sets including pixel data for at least two pixels, and wherein the sets of pixel data read from said video buffers are supplied to said display driver.

29. A computer system as recited in claim 28, wherein said look-up table translucently combines the corresponding pixel data to produce the resultant pixel data.

30. The computer system according to claim 23, wherein said computer system further performs an activity in accordance with the recognized portion of the handwritten input.

31. The computer system according to claim 23, wherein the activity is the execution of a command.

32. The computer system according to claim 30, wherein the activity is the display of a graphic item on the video display.

* * * * *